United States Patent
Cook et al.

(10) Patent No.: US 8,165,558 B2
(45) Date of Patent: Apr. 24, 2012

(54) CLIENT DEVICE FOR CELLULAR TELEPHONE AS SERVER

(75) Inventors: Colin N. B. Cook, Riverton, UT (US); Donald T. Saxby, Salt Lake City, UT (US); Joseph A. Harris, West Jordan, UT (US)

(73) Assignee: Celio Technology Corporation, Salt Lake City, UT (US)

( * ) Notice: Subject to any disclaimer, the term of this patent is extended or adjusted under 35 U.S.C. 154(b) by 733 days.

(21) Appl. No.: 12/206,574

(22) Filed: Sep. 8, 2008

(65) Prior Publication Data
US 2010/0063994 A1    Mar. 11, 2010

(51) Int. Cl.
| | |
|---|---|
| H04M 11/00 | (2006.01) |
| H04M 3/00 | (2006.01) |
| H04M 1/00 | (2006.01) |
| H04W 24/00 | (2009.01) |
| H04B 5/00 | (2006.01) |
| H04B 7/00 | (2006.01) |
| H04B 1/38 | (2006.01) |
| G06F 15/16 | (2006.01) |

(52) U.S. Cl. ........ 455/403; 455/420; 455/424; 455/425; 455/41.1; 455/41.2; 455/41.3; 455/556.1; 455/556.2; 455/557; 455/574; 455/575.1; 455/575.6; 455/90.3; 709/203

(58) Field of Classification Search .................. 455/403, 455/420, 424, 425, 41.1–41.3, 556.1–556.2, 455/557, 574, 575.1, 575.6, 90.3; 709/203
See application file for complete search history.

(56) References Cited

U.S. PATENT DOCUMENTS

| | | | |
|---|---|---|---|
| 2001/0055965 A1* | 12/2001 | Delp et al. | 455/420 |
| 2004/0203363 A1* | 10/2004 | Carlton et al. | 455/41.2 |
| 2006/0135216 A1* | 6/2006 | Collavo et al. | 455/569.2 |
| 2007/0021144 A1* | 1/2007 | Atkinson et al. | 455/556.1 |

OTHER PUBLICATIONS

Proprietary software, Wikipedia, 11 pages.*
Firmware, Macmillan Dictionary, 1 page.*
Palm OS, Wikipedia, 15 pages.*

* cited by examiner

Primary Examiner — Nick Corsaro
Assistant Examiner — Munsoon Choo
(74) Attorney, Agent, or Firm — Kilpatrick Townsend & Stockton LLP; Kenneth R. Allen

(57) ABSTRACT

A new class of thin client called a trans client for operation with a smart cellular telephone as its server does not contain its own user interface (UI) and operating system (OS) and has no capability to run user programs as a standalone apparatus. Its purpose and capability is to display remote content and to provide user input interface. It is built with the slowest processing and lowest power consumption possible with the lowest cost and has security features to assure integrity of operations.

5 Claims, 1 Drawing Sheet

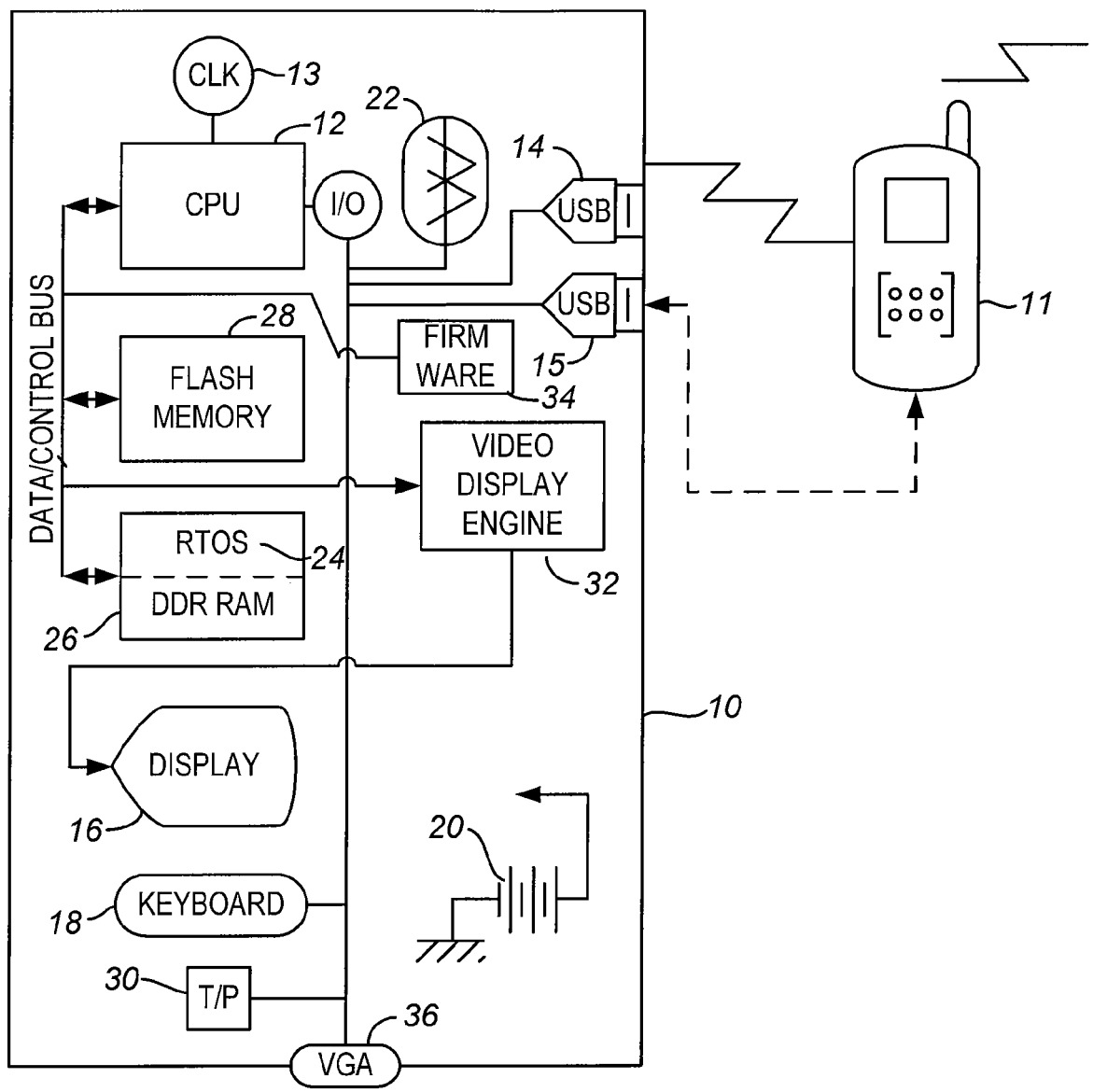

CLIENT DEVICE FOR CELLULAR TELEPHONE AS SERVER

CROSS-REFERENCES TO RELATED APPLICATIONS

There are other patent applications pending in the portfolio of the assignee of the present invention.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to client-server technology. More particularly, this invention relates to a thin client-like apparatus in a cellular telephone environment.

A typical cellular telephone is an end-user device and operates as a client in many respects. It acts as a client within the cellular telephone network, and specifically it acts as a client to a network cloud having web data. And in it acts as a client to host servers in the cloud. A cellular telephone was never designed or intended to operate as a server it self. However, in connection with the present invention, software has been developed by the assignee of the present invention, Celio Corporation of Salt Lake City, Utah, to transform certain kinds of cellular telephones into special purpose servers for use with a proposed new type of client as herein more fully described. Aspects of such software are described in connection with co-pending U.S. patent application Ser. Nos. 12/042,911 and 12/042,942 filed Mar. 5, 2008.

A typical thin client device of the prior art has a processor and an operating system with a user interface, where the operating system is sufficiently enabled to run so-called thin client programs, most notably a web browser. The thin client applications typically run within such an environment. Examples include a Web-enabled word processor program, terminal programs that display content requested from a host or server and a remote access client program that shows the desktop of a remote computer.

A true thin client application is a conventional computer program that runs in the context of normal operating system with normal user interface functions. A thin client computer is merely a full function computer with limited storage or specialty input/output capabilities in communication with a much more powerful computer providing processing for a plurality of users through a thin client as the user interface. The thin client computer may run a little slower as compared with other desktop or laptop computers because all it needs to do is run the thin client application framework. Nevertheless, the thin client computer and its operating system typically has all the features of a full function operating system, even the same operating system of its server, and has the capability to allow its user to decide to run standalone programs. The typical thin client program is a loadable application suited to the thin client computer with an internal file system, system DLLs, and startup scripts that can be run locally.

Thin client programs and thin client computers systems have been found to be inadequate in respect to power consumption and security. First, because they use much of the same hardware that any conventional computer system uses, much more power is consumed than is actually necessary to carry out its tasks. If battery operated, the device has either bulky batteries, a charger or very limited permissible operational period. Moreover, since the underlying operating system is derived from or actually is a general use operating system, the device is just as susceptible to the known security issues and vulnerabilities of its base operating system.

BRIEF SUMMARY OF THE INVENTION

According to the invention, a new class of thin client is provided that operates with a smart cellular telephone as its server and that does not contain its own user interface (UI) and operating system (OS) but has no capability to run user programs as a standalone apparatus. Its purpose and capability are to display remote content and to provide user input interface. It is built with the slowest processing and lowest power consumption possible at the lowest practical cost and has security features to assure integrity of operations. This device is hereinafter denominated a trans client to distinguish it from a true thin client. As hereinafter explained, this device additionally becomes the new client to a cellular telephone of the type known as a smart phone that has been turned into a special purpose server. This non-obvious pairing of technologies allows the creation of new class of a dependent peripherals for cellular smart phones that enable users to use cell phone much like a full-sized computer.

Unlike a thin client, a trans client according to the invention has only a rudimentary embedded operating system (OS): it does not have an extensible Window Manager, it cannot load user applications, and it has no user storage. The trans client hardware is built around a microprocessor of low power consumption, very limited computing power and as a consequence relatively low speed (e.g., 50 MHz clock speed as compared to a current typical CPU clock speeds of 1 GHz) and its designed purpose is to manage data flow between the server supplying the screen image and the device while consuming minimal power. A trans client also has hardware components to render video images using minimal power and no mass storage. It is designed to be inexpensive and to use minimal power to maximize battery life, particularly for the purpose of enhancing the user interface experience of a cellular telephone.

Because of the low computing requirements and custom embedded OS, a trans client has very minimal memory requirements, thus helping reduce power consumption requirements. For example, where a typical thin client of the present era may require 128 MB to 512 MB of RAM, a trans client typically employs only a modest amount of low power mobile DDR random access memory (e.g., 16 MB to 32 MB of RAM). Moreover, in contrast to a typical thin client requirement of 64 MB to 128 MB of persistent memory storage, such as flash memory, a trans client may need only 1 MB to 2 MB of persistent memory for Operating System Image. A key distinction is that a trans client must be built with the lowest power requirements and highest security in order to enable the trans client to cell phone server connection while maintaining long battery life, good security and low cost.

The invention will be better understood by reference to the following detailed description in conjunction with the accompanying drawing.

BRIEF DESCRIPTION OF THE DRAWINGS

FIG. 1 is a schematic block diagram of a trans client 10 according to the invention.

DETAILED DESCRIPTION OF THE INVENTION

FIG. 1 illustrates key features unique to a trans client 10 according to the invention.

The trans client 10 according to the invention is dedicated to operating with a smart cellular telephone 11 as its server and includes the following components and features:

1) a low power and consequently slow (e.g., 50 MHz) embedded microprocessor as a CPU 12, controlled by an appropriately slow internal system clock 13;
2) USB Host-type ports 14, 15, which may be of the so-called high speed type;
3) an embedded display 16;
4) an embedded QWERTY keyboard 18;
5) low power consumption suitable for use with a battery 20 having a long life and/or a small size and minimal cost, depending upon user configuration;
6) a Bluetooth port 22;
7) a VGA output port 36 for use with an external display;
8) a small embedded operating system 24 stored in RAM as a single image that cannot be extended;
9) an operating system 24 configured without a desktop shell, a loadable file system or any mechanism that would allow a user to load independent programs;
10) a modest amount of nonexpandible random access memory such as low power (slower) mobile DDR memory 26;
11) 1 MB of persistent memory that is nonexpandible, such as SPI Flash memory 28;
12) a touchpad 30;
13) an internal hardware based video display engine 32; and
14) firmware 34 incorporating data processing protocols to limit CPU usage.

One of the features the trans client 10 specifically lacks is a window manager other than basic functions to display simple error and connection messages.

Low power usage is a particular advantage of the device thanks to the intentional utilization a slower CPU 12, the lack of user accessible storage, and the feature of hardware-based video rendering 32 built into the device.

A thin client of the prior art is not capable of sufficient reconfiguration to match the capabilities of the present invention, including energy efficiency. Thin client computers are by their very nature designed to run as fast as possible. In the case of web browser thin client computers, an entire HTML display engine resides on the thin client computer and must be updated to keep up with ever-changing HTML protocols. Each new update adds more commands that need more processing power and increases security risks.

The trans client 10 according to the invention is not capable of processing any other data from the server besides a simple set of commands that are specific to its server's operating system, namely a smart phone operating system adapted to communicate with the trans client. For example, the command to execute "display this shape, this way" is the basic video command. Although the video commands are basic in nature, they may include advanced 3D operations that the hardware can display with ease at low power.

The trans client 10 according to the invention is intended to consume as little power as possible. To this end, the trans client CPU 12 is a low speed microprocessor that is so implemented as to run at the absolute slowest speed possible that is needed to display the server screen data, a counter-intuitive notion in any comparable computer environment, where speed is everything and every new device needs a faster processor. By employing the approach of a reduced hardware platform, with restrictions on storage and expandibility, the trans client 10 can be manufactured inexpensively and operate long hours, thereby making it a useful and low-cost product to optimize the usability of the appropriate cellular telephone 11 acting as a server having storage, processing power, a conventional operating system, such as Windows Mobile, and yet with a battery life many times than that of conventional thin clients that are battery operated.

Total Cost of Ownership (TCO) is another notable advantage derived from the choice of features of the trans client 10. While some thin clients may be promoted as having a "reduced" cost of ownership, they still rely on off-the-shelf operating systems, such as Windows XP or Linux. These systems need regular updates, which may be costly. The trans client 10 does not require an internal touch pad, an external keyboard or display, as it functions the same even if it has external I/O devices.

In an alternative embodiment, a trans client may be designed with even less features, namely only internal I/O with no external ports.

The invention has been explained with reference to specific embodiments. Other embodiments will be evident to those of ordinary skill in the art. It is therefore not intended that this invention be limited, except as indicated by the appended claims.

What is claimed is:

1. A client apparatus for providing an enhanced user interface for a cellular telephone operative as a server comprising:
   a low-power embedded microprocessor operative under control of a relatively slow system clock;
   USB Host-type ports;
   embedded operating system as a single nonextendable image;
   nonexpandible random access memory;
   nonexpandible persistent memory;
   an internal hardware-based video display engine; and
   firmware incorporating data processing protocols to limit usage of said CPU, such that said apparatus is dependent upon the cellular telephone for functionality;
   wherein the operating system has no file system, has no user shell that would permit independent operation and is incapable of loading application programs.

2. The apparatus of claim 1 wherein said apparatus includes at least one of the following features:
   a battery connection to provide for long period and/or portable operation;
   an embedded display; an internal QWERTY keyboard;
   a Bluetooth port; and
   a touch pad.

3. The apparatus of claim 1 wherein said nonexpandible random access memory is in an amount less than or equal to 32 MB.

4. The apparatus of claim 3 wherein said persistent memory is in an amount of less than or equal to 2 MB of flash memory.

5. The apparatus of claim 1 further including a computer video output port.

* * * * *